United States Patent [19]

Lin

[11] Patent Number: 4,529,820
[45] Date of Patent: Jul. 16, 1985

[54] CYANOUREA COMPOUNDS

[75] Inventor: Shiow-Ching Lin, Columbia, Md.

[73] Assignee: W. R. Grace & Co., New York, N.Y.

[21] Appl. No.: 581,373

[22] Filed: Jul. 9, 1984

Related U.S. Application Data

[62] Division of Ser. No. 331,951, Dec. 18, 1981.

[51] Int. Cl.³ ................... C07C 126/04; C07C 127/00
[52] U.S. Cl. ......................................... 564/51; 564/50; 564/57; 564/59; 260/465.4; 525/123; 560/26
[58] Field of Search ....................... 564/47, 50, 51, 59, 564/57; 260/465.4; 560/26; 525/123

[56] References Cited

U.S. PATENT DOCUMENTS 4,379,728  4/1983  Lin ................................... 156/307.3

FOREIGN PATENT DOCUMENTS 271006  2/1970  U.S.S.R. ............................... 528/44

*Primary Examiner*—Charles F. Warren
*Assistant Examiner*—Roberta Picard
*Attorney, Agent, or Firm*—Richard P. Plunkett; William W. McDowell, Jr.

[57] ABSTRACT

This invention relates to novel cyanourea compounds of the formula:

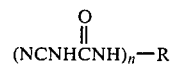

wherein R is the organic moiety of a polyisocyanate remaining after reaction of the isocyanate groups to form cyanourea groups and n is at least 2. The compound can be polymerized at room temperature to form a polymer having the recurring structural formula:

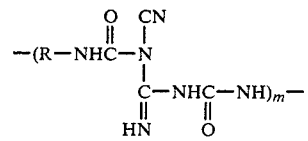

i.e., N,N'-biscarbamyl-N-cyanoguanidine units connected together through the R group of the carbamyl moiety and m is greater than 2, or can be cured to a thermoset material on heating above 90° C.

2 Claims, No Drawings

CYANOUREA COMPOUNDS

This is a division, of application Ser. No. 331,951, filed Dec. 18, 1981.

This invention relates to novel cyanourea compounds. The invention also relates to polymeric materials and a process for forming said polymeric materials from said cyanourea compounds. Additionally, the invention relates to the formation of thermoset materials from said novel cyanourea compounds which can be used as one component adhesives, sealants or coatings.

DESCRIPTION OF THE PRIOR ART

It is known to form 1-cyano-3-phenylurea. This product has a melting point in the range 122°–126° C. whereat it decomposes and fails to form a clear melt during the decomposition. See Organic Synthesis IV, pp. 213–217, J. Wiley & Sons, Inc., 1963.

OBJECTS OF THE INVENTION

One object of the instant invention is to produce a novel cyanourea compound. Another object of the invention is to produce a polymer from said cyanourea compound. Yet another object of the instant invention is to produce a one component adhesive, sealant or coating from said cyanourea compound which on heating cures to a thermoset material. Yet another object of the instant invention is to produce a process for forming a polymer from said cyanourea compound. These and other objects will become apparent from a reading hereinafter.

DESCRIPTION OF THE INVENTION

This invention relates to novel cyanourea compounds of the formula:

wherein R is the organic moiety of a polyisocyanate remaining after reaction of the isocyanate groups to form cyanourea groups and n is at least 2. The compound can be polymerized at room temperature to form a polymer having the recurring structural formula:

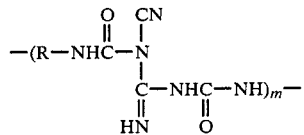

i.e., N,N'-biscarbamyl-N-cyanoguanidine units connected together through the R group of the carbamyl moiety and m is greater than 2, or can be cured to a thermoset material on heating above 90° C.

The monomeric cyanourea compound can be formed by reacting a polyisocyanate with cyanamide to form a cyanourea compound, i.e.,

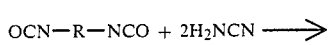

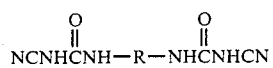

In reaction (1) supra the reactants are reacted in amounts ranging from stoichiometric up to a 5% molar excess of either reactant. The reaction is carried out under atmospheric conditions but can also be performed in an inert, e.g., nitrogen atmosphere, to avoid any reaction between the isocyanate groups and water in the atmosphere. The reaction is preferably carried out at room temperature. However, in some instances the cyanamide reactant is heated above its melting point, e.g., at about 50° C., mixed with the polyisocyanate and thereafter the reaction is run at room temperature.

Although the reaction is usually run in the absence of a solvent, the organic solvents such as dioxane and toluene can be used if desired. The reaction can be run in aqueous medium also by dissolving cyanamide in a sodium hydroxide solution and isocyanate in an inert water soluble solvent such as n-methyl pyrrolidone, dioxane and 2-ethoxyethyl ether, i.e., $$H_2NCN + NaOH(aq) \longrightarrow NaHNCN(aq)$$

NaHNCN + OCN—R—NCO (solvent) ⟶

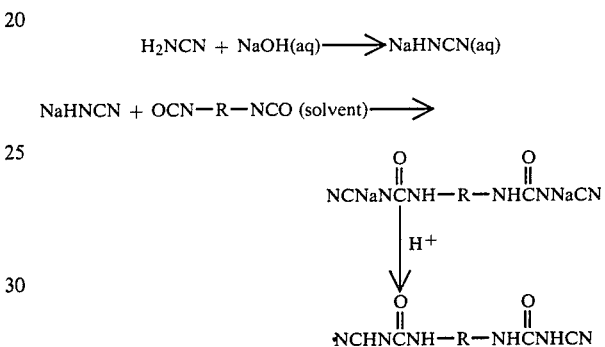

One method of determining completion of the reaction is to monitor the decrease in NCO content with IR. Acid or acid chloride stabilizers such as benzoyl chloride, p-toluenesulfonic acid and p-toluenesulfonic chloride, are usually added to the reaction to avoid polymerization of the resultant monomer product.

The polyisocyanates employed in the instant invention to form the novel cyanourea compounds by reaction (1) can be aromatic, aliphatic, cycloaliphatic and combinations thereof. Preferred are the diisocyanates, but tri- amd tetraisocyanates are also operable. More specifically, illustrative of the diisocyanates are 2,4-toluene diisocyanate, m-phenylene diisocyanate, xylylene diisocyanate, 4-chloryl-1,3-phenylene diisocyanate, 4,4'-biphenylene diisocyanate, 1,4-tetramethylene and 1,6-hexamethylene diisocyanate, 1,4-cyclohexylene diisocyanate, 1,5-tetrahydronaphthalene diisocyanate and methylene dicyclohexylene diisocyanate. Diisocyanates in which each of the diisocyanate groups is directly attached to a ring are preferred since usually they react more rapidly.

Other diisocyanates which may be used are the high molecular weight diisocyanates obtained by reacting polyisocyanates with polyamines containing terminal primary or secondary amine groups or dihydric alcohols. For example: 2 moles of diisocyanate $R_5(NCO)_2$ are reacted with 1 mole of a diol $OH—R_6—OH$ to form a chain extended diisocyanate, i.e.,

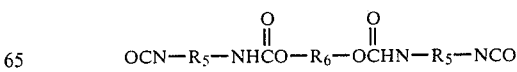

wherein $R_5$ and $R_6$ are divalent organic moieties. Thus, the alkane and alkene polyols such as 1,5-pentene diol, ethylene glycol, polyethylene glycol, propylene glycol, polypropylene glycol, "Bisphenol-A" and substituted "Bisphenol-A" are operable herein to chain-extend the diisocyanate reactant. These diols can have molecular weights ranging from about 200 up to about 20,000.

Additionally, unsaturated diisocyanates can also be employed. These materials, for example, can be formed from diols such as the family of hydroxyl terminated homopolymers and copolymers, commercially available from ARCO under the tradename "Poly bd" resins. Such resins include butadiene homopolymers of the formula:

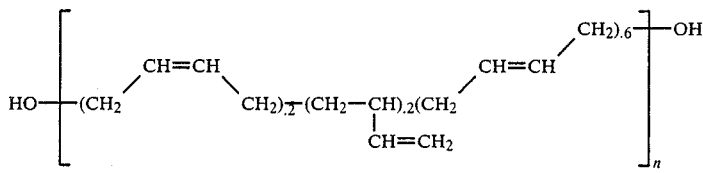

wherein n is about 50, and styrene-butadiene and acrylonitrile-butadiene copolymer diols of the formula:

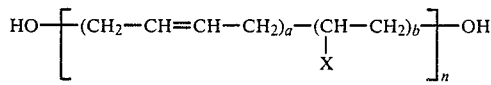

wherein

| X = O for styrene-butadiene copolymer | X = CN for acrylonitrile-butadiene copolymer |
|---|---|
| a = .75 | a = 0.85 |
| b = .25 | b = 0.15 |
| n = 54 | n = 78–87 |

One mole of these unsaturated polyols will react with two moles of a diisocyanate to form a chain-extended diisocyanate having unsaturation in the backbone thereof.

The novel cyanourea monomer compound of the instant invention is readily polymerized to a polymer having the recurring structural formula:

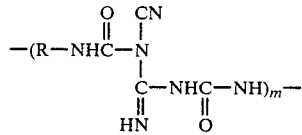

i.e., N,N'-biscarbamyl-N-cyanoguanidine units connected together through the R group of the carbamyl moiety and m is greater than 2. The polymerization is carried out in bulk or in an organic solvent at room temperature for periods ranging from 24 to 100 hours. Organic solvents operable herein for the polymerization reaction include, but are not limited to, N-methylpyrrolidone, N,N-dimethyl acetamide, N,N-dimethyl formamide and tetramethylene sulfoxide.

This polymer can also be prepared directly from the mixture of diisocyanate and cyanamide in a suitable solvent such as N-methyl pyrrolidone without preparing N-cyanourea intermediate, i.e.,

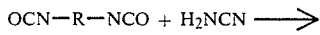

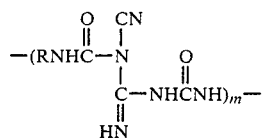

by carrying out the reaction at room temperature for 72 hours or more. Although no catalyst is necessary for the polymerization reaction, it has been found that triethylamine or water in catalytic amounts seem to give a faster reaction rate.

Additionally, it has been found that the novel cyanourea monomer compound can be cured to a thermoset material on heating above 90° C. Upon heating, cyano group (2270 cm$^{-1}$) in IR spectrum disappears at 110° C. in an hour.

The following examples will help in explaining, but expressly not limit, the instant invention. Unless otherwise noted, all parts or percentages are by weight.

EXAMPLE 1

Preparation of Diisocyanate Adduct 104 g of polypropylene glycol (MW=725 g/mole) were added dropwise over a 6 hour-period to a flask containing 50 g of toluene diisocyanate in a nitrogen atmosphere. The reaction was continued with stirring overnight at room temperature. The resultant chain-extended, isocyanate-terminated product will hereinafter be referred to as diisocyanate adduct (A).

EXAMPLE 2

154 g of diisocyanate adduct (A) from Example 1 were heated to 50° C. and mixed with 12 g of cyanamide and 0.8 g of benzoyl chloride as a stabilizer. The reaction was cooled to room temperature and continued with stirring for 3 hours. The IR spectrum of the resultant viscous liquid cyanourea product, i.e.,

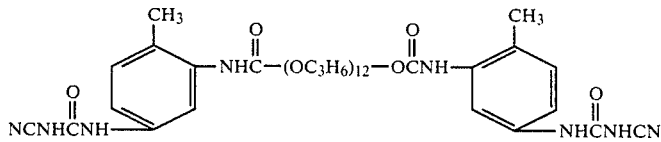

showed the disappearance of —NCO (2340 cm$^{-1}$) and a strong absorption at 2270 cm$^{-1}$ (—C≡N).

EXAMPLE 3

To 50 g of toluene diisocyanate was added dropwise a mixture containing 104 g polypropylene glycol (MW=725 g/mole) and 12 g of cyanamide over a period of 6 hours with stirring in a nitrogen atmosphere. The resultant cyanourea product was the same as that obtained in Example 2.

EXAMPLE 4

After heating at 110° C. for an hour, the N-cyanourea resin from either Example 2 or Example 3 produced a yellow, clear, flexible polymeric material which was not soluble in solvents such as N-methyl pyrrolidone, acetone, toluene and N,N-dimethylacetamide. IR spectrum of the polymer showed the disappearance of the cyano group.

EXAMPLE 5

20 g of a polymethylene polyphenyl isocyanate having a functionality of 2.6 and commercially available under the tradename PAPI 135 from the Upjohn Co. were mixed with 6.3 g of cyanamide. The admixture was heated to 130° C. whereat it turned to a brown, rigid polymeric foam.

EXAMPLE 6

At room temperature, 2 g of cyanamide were mixed with p,p'-diphenylmethane diisocyanate, commercially available from Mobay Chemicals under the tradename "Mondur ®M," and then dissolved in 80 g of n-methylpyrrolidone. After stirring overnight, 8 drops of triethylamine were added as catalyst for polymerization. The stirring was continued for 24 hours. A high viscosity solution was obtained. 50 ml of n-methyl pyrrolidone was added to reduce the viscosity, and a drop of water was added as a second catalyst. The viscosity increased rapidly. After 2 more hours of agitation, acetone was added as non-solvent to precipitate the polymer in flake form. The polymer was collected by filtration and dried in vacuum. IR indicated that the polymer had the following recurring structural unit:

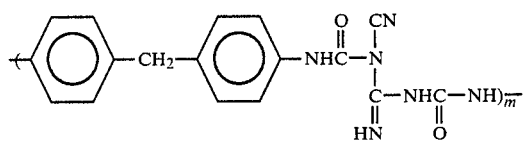

as shown by the following IR data: 3280 cm$^{-1}$, 2180 cm$^{-1}$, 1720$^{-1}$, 1670 cm$^{-1}$, 1610 cm$^{-1}$, 1550 cm$^{-1}$, 1525 cm$^{-1}$, 1420 cm$^{-1}$, 1240 cm$^{-1}$, 1210 cm$^{-1}$. The cyano absorption at 2180 cm$^{-1}$ was completely different from that in cyanourea (2270 cm$^{-1}$) and the same as that in dicyandiamide.

EXAMPLE 7

At room temperature, the unstabilized product from Example 3 gradually increased its viscosity and turned to a clear yellow solid upon standing. The IR spectrum showed the shift of cyano group from original absorption at 2270 cm$^{-1}$ to 2180 cm$^{-1}$. This proved the polymerization of di(N-cyanourea) resin. The final polymer was fusible upon heating at 150° C.

EXAMPLE 8

To a solution of 16.8 g of cyanamide in 50 ml of water is added 50 ml of aqueous 3N sodium hydroxide. To the resulting solution, cooled to about 18° C., is added dropwise a solution of 25 g of pmp'-diphenylmethane diisocyanate in 100 ml of dioxane over a one hour period. At the same time, 50 ml of aqueous 3N sodium hydroxide is also added dropwise at a rate about half that of the addition of the diisocyanate solution. When addition is complete, the slightly turbid liquid is diluted with 40 ml of water and filtered under reduced pressure. The p,p'-diphenylmethane dicyanourea is precipitated from the clear colorless filtrate by slow addition of concentrated hydrochloric acid with stirring until the solution turns to acidity. Cracked ice is added to lower the temperature. After storage at 0° C. for 3 hours the crystals were collected by filtration and dried in vacuum.

EXAMPLE 9

A solution of 3 g of p,p-diphenylmethane dicyanourea in 30 ml of N-methyl pyrrolidone is stirred for 72 hours. A viscous solution is obtained. Polymer was obtained by quenching the solution with acetone. The polymer product of the instant invention, i.e., N,N'-bis-carbamyl-N-cyanoguanidine units connected together through the R group of the carbamyl moiety, can be used as a molding compound to form various shapes and figures.

EXAMPLE 10

The resin, from either Example 2 or Example 3, resulted in a lap shear strength of 300 psi between 2 glass fiber reinforced polyester substrates after being cured at 100° C. for an hour. The resin is useful as an adhesive, coating or sealant based on this result.

What is claimed:

1. A cyanourea compound of the formula:

wherein R is the organic moiety of a polyisocyanate remaining after reaction of the isocyanate groups with cyanamide to form cyanourea groups and n is at least 2.

2. A process of forming a cyanourea compound of the formula:

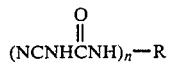

wherein R is the organic moiety of a polyisocyanate remaining after reaction of the isocyanate groups with cyanamide to form cyanourea groups and n is at least 2 which comprises reacting a polyisocyanate with cyanamide in amounts ranging from stoichiometric up to a 5% molar excess of either reactant under atmospheric conditions.

* * * * *